(12) United States Patent
Jurowicz et al.

(10) Patent No.: US 11,120,008 B2
(45) Date of Patent: Sep. 14, 2021

(54) VERIFYING CONFIGURATION MANAGEMENT DATABASE CONFIGURATION ITEMS

(71) Applicant: INTERNATIONAL BUSINESS MACHINES CORPORATION, Armonk, NY (US)

(72) Inventors: Jaroslaw Jurowicz, Cracow (PL); Tomasz P. Kania, Tarnów (PL); Ewa Kilar, Cracow (PL); Wojciech A. Wojcik, Bochnia (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 76 days.

(21) Appl. No.: 16/381,622

(22) Filed: Apr. 11, 2019

(65) Prior Publication Data

US 2019/0236061 A1   Aug. 1, 2019

Related U.S. Application Data

(63) Continuation of application No. 15/156,631, filed on May 17, 2016, now Pat. No. 10,339,128.

(51) Int. Cl.
*G06F 16/30* (2019.01)
*G06F 16/23* (2019.01)

(52) U.S. Cl.
CPC ................. *G06F 16/2365* (2019.01)

(58) Field of Classification Search
CPC ................................................ G06F 16/2365
USPC ........ 707/609, 687, 705, 769, 790, 813, 821
See application file for complete search history.

(56) References Cited

U.S. PATENT DOCUMENTS

| 7,627,745 B2 | 12/2009 | Martinez et al. |
| 8,543,543 B2 | 9/2013 | Marcelais et al. |
| 9,237,180 B2 | 1/2016 | McKay |
| 2006/0149408 A1 | 7/2006 | Speeter et al. |

(Continued)

OTHER PUBLICATIONS

List of IBM Patents or Applications Treated as Related, Apr. 12, 2019, 2 pgs.

(Continued)

*Primary Examiner* — Sana A Al-Hashemi
(74) *Attorney, Agent, or Firm* — Alexander Jochym; Matthew M. Hulihan; Heslin Rothenberg Farley & Mesiti PC

(57) ABSTRACT

A verification check is performed for a configuration management database (CMDB) configuration item (CI), the CMDB CI being an information technology asset of a computing environment and being previously discovered as part of a CMDB CI discovery procedure for a CMDB system, and discovered on a hosting component hosting the CMDB CI. The discovery procedure provides configuration data associated with the CMDB CI, and the configuration data is stored as part of CMDB configuration information of the CMDB system. Performance of the verification check of the CMDB CI is tailored to the CMDB CI, and includes using the configuration data provided by the discovery procedure to target at least one inquiry to the hosting component, which may include an inquiry to the CMDB CI thereof. An updated status of the CMDB CI is determined based on performing the verification check.

19 Claims, 4 Drawing Sheets

(56) References Cited

U.S. PATENT DOCUMENTS

| | | | |
|---|---|---|---|
| 2006/0179116 A1 | 8/2006 | Speeter et al. | |
| 2010/0115520 A1* | 5/2010 | Kohno | G06F 9/4881 718/101 |
| 2014/0280268 A1* | 9/2014 | Mckay | H04L 67/34 707/758 |
| 2014/0297342 A1* | 10/2014 | Ogata | G06F 16/288 705/7.11 |
| 2015/0317318 A1* | 11/2015 | Hadzhiyski | G06F 16/90332 707/752 |
| 2016/0217042 A1* | 7/2016 | Wang | G06F 11/1464 |
| 2017/0337236 A1 | 11/2017 | Jurowicz et al. | |

OTHER PUBLICATIONS

Maintaining a Filing System, Identifying Inactive Files, accessed Jan. 30, 2016, http://f2.washington.edu/fm/recmgt/filesmanagement/filesystem, 3 pages.

Hierarchy of Methods for Discovering Application Usage in Software License Management, Nov. 17, 2014, IP.com No. IPCOM000032890D, ip.com, 2 pages.

* cited by examiner

VERIFYING CONFIGURATION MANAGEMENT DATABASE CONFIGURATION ITEMS

BACKGROUND

A Configuration Management Database (CMDB) System provides a repository (e.g. database) that holds information about a collection of information technology (IT) assets in an organization's IT-related assets. The IT assets are commonly referred to as Configuration Items (CI), which are indicated in the CMDB together with descriptive relationships between such assets. The Configuration Items are discovered using software provider(s) usually included in CMDB-related products, such as the Tivoli® Application Dependency Discovery Manager (TADDM) offered by International Business Machines Corporation, Armonk, N.Y., U.S.A. (TIVOLI is a registered trademark of International Business Machines Corporation). The discovery of the CIs typically produces collections of configuration information including records for the CIs themselves, relationships between CIs, CI attributes (such as unique identifier, name, description, ownership) and CI types. Example CI types include hardware, software, communications/networks, location, documentation, and people (personnel), though other examples exist.

SUMMARY

Shortcomings of the prior art are overcome and additional advantages are provided through the provision of a computer-implemented method that includes obtaining an indication that a verification check is to be performed for a configuration management database (CMDB) configuration item, the CMDB configuration item being an information technology asset of a computing environment and being previously discovered as part of a CMDB configuration item discovery procedure for a CMDB system, the CMDB configuration item being previously discovered on a hosting component hosting the CMDB configuration item, the discovery procedure providing configuration data associated with the CMDB configuration item, and the configuration data stored as part of CMDB configuration information of the CMDB system; performing a verification check of the CMDB configuration item, the verification check being tailored to the CMDB configuration item, and the performing the verification check including using the configuration data provided by the discovery procedure to target at least one inquiry to the hosting component; and determining an updated status of the CMDB configuration item based on performing the verification check.

Further, a computer program product including a computer readable storage medium readable by a processor and storing instructions for execution by the processor is provided for performing a method that includes obtaining an indication that a verification check is to be performed for a configuration management database (CMDB) configuration item, the CMDB configuration item being an information technology asset of a computing environment and being previously discovered as part of a CMDB configuration item discovery procedure for a CMDB system, the CMDB configuration item being previously discovered on a hosting component hosting the CMDB configuration item, the discovery procedure providing configuration data associated with the CMDB configuration item, and the configuration data stored as part of CMDB configuration information of the CMDB system; performing a verification check of the CMDB configuration item, the verification check being tailored to the CMDB configuration item, and the performing the verification check including using the configuration data provided by the discovery procedure to target at least one inquiry to the hosting component; and determining an updated status of the CMDB configuration item based on performing the verification check.

Yet further, a computer system is provided that includes a memory and a processor in communications with the memory, wherein the computer system is configured to perform a method that includes obtaining an indication that a verification check is to be performed for a configuration management database (CMDB) configuration item, the CMDB configuration item being an information technology asset of a computing environment and being previously discovered as part of a CMDB configuration item discovery procedure for a CMDB system, the CMDB configuration item being previously discovered on a hosting component hosting the CMDB configuration item, the discovery procedure providing configuration data associated with the CMDB configuration item, and the configuration data stored as part of CMDB configuration information of the CMDB system; performing a verification check of the CMDB configuration item, the verification check being tailored to the CMDB configuration item, and the performing the verification check including using the configuration data provided by the discovery procedure to target at least one inquiry to the hosting component; and determining an updated status of the CMDB configuration item based on performing the verification check.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
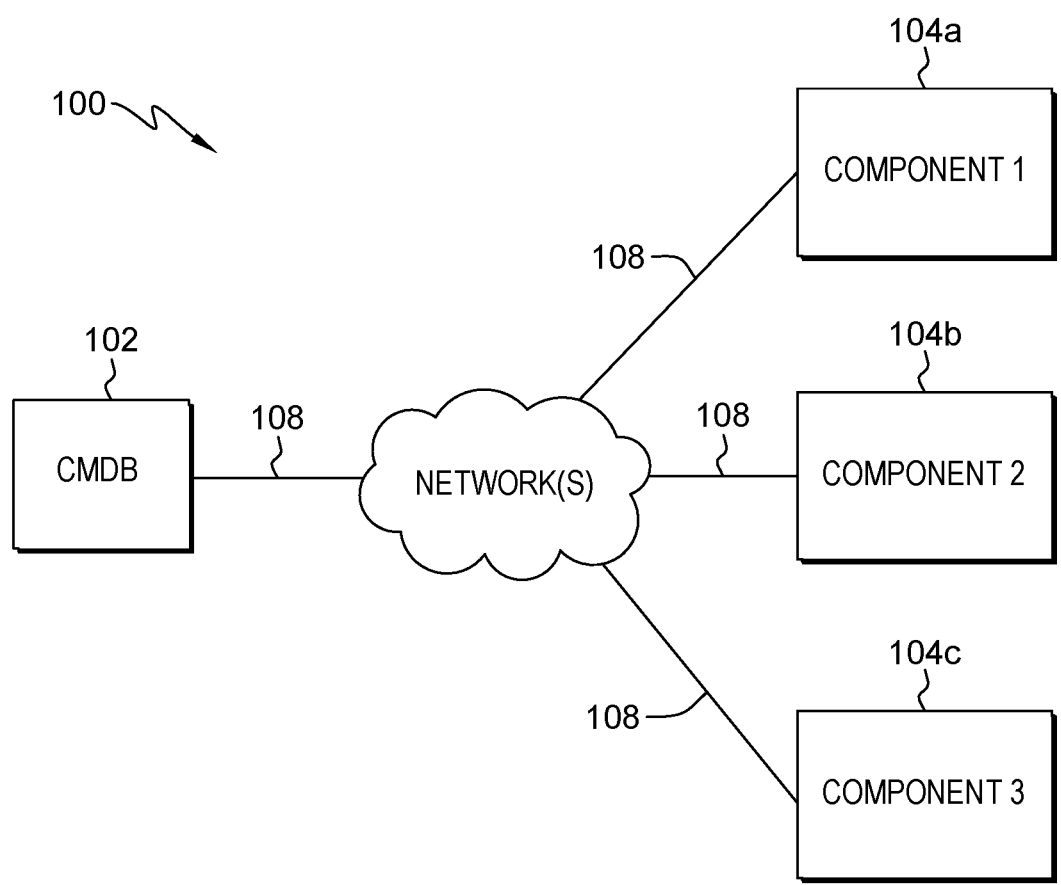
FIG. 1 illustrates an example information technology environment to incorporate and use aspects described herein.

As noted, a Configuration Management Database (CMDB) system provides a repository (e.g. database) that holds information about a collection of information technology (IT) assets commonly referred to as configuration items (CIs), as well as descriptive relationships between such assets. The CMDB system typically includes one or more databases (which may be referred to as the CMDB) to store this information. Because the CMDB database is usually tied to some coordinating system, the terms "CMDB" and "CMDB system" are sometimes used to collectively refer to the database and the coordinating computer system. An examples CMDB system is described below.

A Configuration Item is an IT asset that is discovered by using CMDB discovery software provider(s). Discovery refers to a method/process of gathering data about the IT assets and (potentially) transforming it for storage in the CMDB database. Such discovery software/method may be agent-less (in which no special software is required to be installed on each IT asset) or agent-based.

Context IP/Hostname refers to the Internet Protocol (IP) address and/or hostname used by the discovery provider to discover particular Configuration Items, for example by using a standardized protocol such as Secure Shell (SSH). Usually the context IP/hostname is a target machine (e.g. computer system) IP/hostname.

Discovery provider refers to software responsible for discovery of particular type(s) of CIs. Different discovery providers may discover different types of CIs, for example one provider may be for the discovery of an Apache® HTTP server (APACHE is a registered trademark of the Apache Software Foundation). Traditional or regular discovery is usually a time consuming operation that attempts to discover all CIs on all IT assets by running all discovery providers.

Described in some aspects herein are facilities for efficient on-demand verification of pre-discovered IT asset configuration items based on pre-discovered configuration data. As noted above, discovery of the IT infrastructure using traditional discovery providers, usually included in CMDB-related products and software, can be time consuming. In the case of a large corporate enterprise, it might take a week or more time, especially when utilizing agentless discovery providers. If a customer or other stakeholder desires to check whether one or more already-discovered CIs, such as software component(s), are still valid, they will re-run the discovery procedure against some defined broad scope. This can be a time-consuming operation and the discovery could produce extraneous data than the customer does not desire. A significant contributing factor to the time it takes a traditional discovery procedure to complete is the Configuration Item identifier (e.g. GUID) calculation method, example of which include a tree of context objects with naming rule fields being discovered before a CI can be stored. The provider must discover a relatively extensive amount of information from the target machines in order to gather the required fields and structure of the Configuration Items. Consequently, existing solutions are not efficient since the running time necessary to check for even merely changes in the already-discovered Configuration Items is too long. In this regard, from an IT perspective, an entity may be interested in refreshing and/or validating information about one or more specific configuration items without engaging in a full-fledged Discovery procedure.

In addition to the above problems, traditional discovery procedures are configured to discover, with respect to applications, only those that are running applications. Therefore, when a discovery does not discover a particular software component, it is not known whether the component does not exist (it is a dormant/deleted object) or is just stopped or damaged. Current solutions fail to effectively differentiate between dormant software components that do not exist and the components that exist but are not running and/or are damaged.

Accordingly, aspects presented herein describe ways to provide desired CI information to IT administrators by leveraging pre-discovered and currently-available configuration data associated with the CIs. By way of specific example, a traditional/regular discovery to find configuration of an Apache® HTTP Server instance that was already prior-discovered would discover/listen to running processes of the machine, find appropriate addresses, find the location where the server is installed on the hard drive, scan for the configuration files for this sever, etc. It would then gather all of this information to calculate the unique identifier (e.g. GUID) for the Configuration Item(s) associated with that server asset. In contrast to this approach, aspects of the present disclosure perform a verification check on the asset by focusing on and using configuration file information already available to the CMDB system. Information such as the identification and location of the target machine and the location of the file(s) of that machine having the desired updated information is already stored with the CMDB. The process can directly target the machine (hosting component) holding the asset to look for the appropriate file(s) on the path that is stored with the database and ascertain the status of the file (change, missing, etc.) to provide the CMDB/IT administrator with a fresh configuration file in the CMDB.

In some embodiments, these aspects are incorporated into process(es) run by the CMDB software designed for finding the configuration data on the targets and storing the data in an appropriate format in the CMDB.

Referring to FIG. 1, which depicts an example IT environment to incorporate and use aspects described herein, IT environment 100 includes a CMDB system 102 in communication with infrastructure components 104a-104c, which comprise IT assets. This communication occurs via wired and/or wireless communications links 108 across one or more networks, such as one or more local area networks (LANs) and/or wide area networks (WANs). In some embodiments, the network(s) is/are a private network of an organization, possibly geographically distributed and connected via secure tunnels. Additionally or alternatively, the network may include a wide area network such as the internet.

The IT assets of components 104a-104 are discovered and maintained as Configuration Items with the CMDB system 102. By way of specific example, Component 1 104a may be an Apache® HTTP server, and Component 2 104b may be a collection of Storage Area Network (SAN) devices. The Configuration Items may be these components themselves and/or sub-components of components 104a-104c, such as hardware or software elements of a specific component 104.

Further details and examples are provided of using already-discovered configuration item data to quickly verify discovered components. This can be applied to many different types of infrastructure elements (CIs). Examples described herein focus on software component Configuration Items by way of example and not limitation.

The following list specifies example configuration data maintained by the CMDB system based on discovery of software component type CIs: configuration files; file checksums of binary files, for example war, ear, jar; status of the software component server (e.g. installed, running, stopped); runtime process information (command line, listen IP address and port).

To perform a verification check of CMDB CIs that are already stored in the CMDB database (i.e. known to the CMDB based on a prior discovery procedure), the particular configuration data necessary for performing the verification may be identified and checked. This means that certain configuration data and any other information that is not essential to perform the relatively narrow task of verifying the particular CI need not be accessed or used for the verification check. An example of this information is the discovery of naming rules fields. Example configuration data that is associated with the CMDB CI and that may be used for the verification check is:

file content of the configuration file (e.g. file path is stored in CMDB);

file checksum of binary files and/or other types of;

command line, listen IP and port for runtime processes associated with an Application Server; and installation path for any software.

A verification check for a CI can be triggered in any manner desired, for example on-demand, scheduled for selected targets, and/or in parallel with traditional/regular target discovery.

In addition, a verification check can also provide a way to confirm that a particular software component does not exist and therefore can be marked as dormant, or ready to delete, as explained in further detail below.

Further, the verification check presented herein can be combined with a traditional/regular discovery. In such a regular discovery, the components that are not running cannot be discovered. Combining the regular discovery method with aspects of the verification check described herein enables the CMDB system to re-discover data of previously discovered but currently stopped (not running) software components (which regular discovery will not pick up on), and verify whether the software component does not exist, or is just inactive/stopped. Knowing these statuses of the CIs can be critical for IT administrators.

The verification check approach of the present disclosure provides a more efficient and different solution to discover software components than that provided through software component discovery of a probed target computer and comparison to new existing configuration data. The verification check described herein uses data obtained by the discovery process and time-efficient methods to check whether the discovered configuration item still exists and is up to date (changed). This can be accomplished, at least in part, by targeting the hosting component hosting the CI and/or the CI itself with one or more inquiries. Some inquiries for verifying the CI are properly to be handled by the hosting system (for instance a check that a filesystem path to a CI still exists). Conversely, some inquiries for verifying the CI are properly to be handled or targeted to the CI itself (for instance computation of a checksum of the CI, or a query to the CI for which the CI is expected to handle and respond in an expected manner).

Changed data may dictate updates to the CMDB configuration information about the CMDB configuration item to reflect the updated status of the CI. Further, the verification check can discover CIs, such as software components, that are not running, and check data of CIs, such as software components, that are not running, or perhaps even damaged, if they were discovered at least once in a prior discovery procedure.

Figure 2:
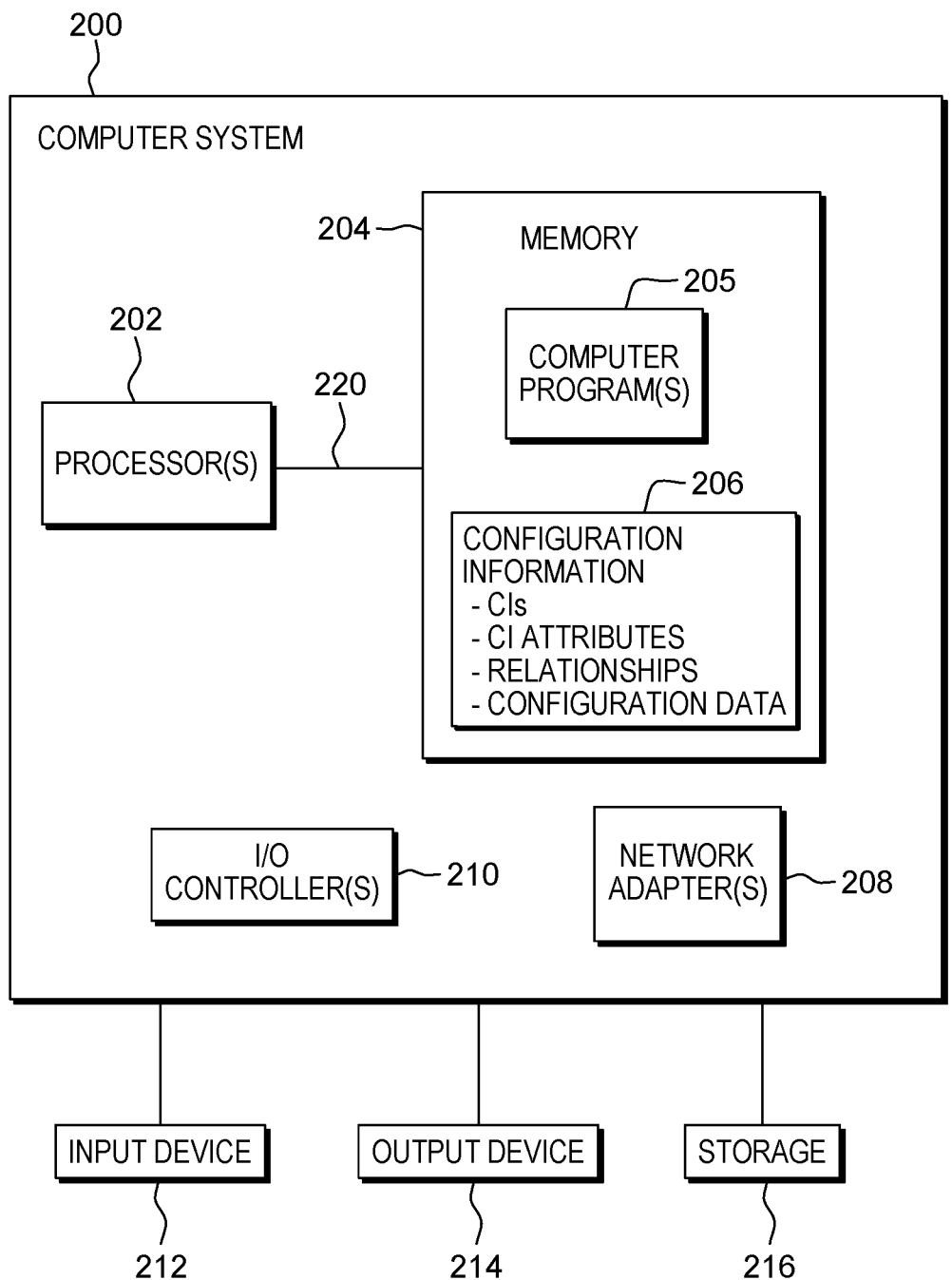
FIG. 2 depicts an example computer system to incorporate or use aspects described herein.

Various processes are described herein that may be performed singly or collectively by one or more computer systems, such as one or more CMDB systems. An example such computer system to incorporate or use aspects described herein is presented with reference to FIG. 2. A computer system may also be referred to as a processing device/system or computing device/system, or simply a computer. Computer system 200 may be based on one or more of various system architectures such as those offered by International Business Machines Corporation (Armonk, N.Y., USA) or Intel Corporation (Santa Clara, Calif., USA), as examples.

Computer system 200 is suitable for storing and/or executing program code and includes at least one processor 202 coupled directly or indirectly to memory 204 through, e.g., a system bus 220. In operation, processor(s) 202 obtain from memory 204 one or more instructions for execution by the processors. Memory 204 may include local memory employed during actual execution of the program code, bulk storage, and cache memories which provide temporary storage of at least some program code in order to reduce the number of times code must be retrieved from bulk storage during program code execution. A non-limiting list of examples of memory 204 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 204 includes computer programs 205, such as an operating system and programs to perform aspects described herein.

Additionally, memory 204 includes in this example configuration information 206, that includes indications of the CIs, CI attributes, relationships among the CIs CMDB CI configuration data provided by one or more discovery procedure(s).

Input/Output (I/O) devices 212, 214 may be coupled to the system either directly or through I/O controllers 210 to facilitate input/output.

Network adapter(s) 208 may also be coupled to the system to enable the computer system to become coupled to other computer systems, storage devices, or the like through intervening private or public networks. Ethernet-based interfaces are just examples of the currently available types of network adapters 208 used in computer systems.

Computer system 200 may be coupled to storage 216 (e.g., a non-volatile storage area, such as magnetic disk drives, optical disk drives, a tape drive, etc.), having one or more databases. Storage 216 may include an internal storage device or an attached or network accessible storage. Computer programs in storage 216 may be loaded into memory 204 and executed by a processor 202 in a manner known in the art. In addition, storage 216 may house a configuration management database housing configuration information, such as configuration information 206 shown loaded into memory 204 in FIG. 2.

The computer system 200 may include fewer components than illustrated, additional components not illustrated herein, or some combination of the components illustrated and additional components. Computer system 200 may include any computing device known in the art, such as a mainframe, server, personal computer, workstation, laptop, mobile computer, virtualization device, storage controller, etc.

An example process flow to perform aspects described herein is presented by way of specific example and not limitation. The process performs a method to quickly check and verify Configuration Item (CI) condition, by performing a quick and simple discovery and returning only (in some examples) the current/updated status of the CI. It can be easily determined whether the CI is a dormant object, or whether it was updated. The simplicity and efficiency is attained, in part, by leveraging the previously stored information (where the software is installed, where the configuration file is located, an indication of the port on which the software listens)—this information is used to quickly go to the specified target a hosting component, such as a hosting computer system, and gather the information that is deemed to be interesting. This may be done without/absent performing a discovery procedure that targets the component as a whole, e.g. all potential CIs hosted/provided by the target.

Initially, a verification check is issued against a Configuration Item, for example based on an indication that a verification check is to be performed for the CI. This can be run on-demand or scheduled, as examples. Information about target system is selected based on context IP address/hostname associated with the CI. A generic check/verification may be performed, which depends of the Configuration Item type. Examples are provided for file and software component type CIs:

If the CI is a file, then the verification check performed by the CMDB system checks whether the file exists on the hosting component. If the file does not exist, then this CI is marked as dormant or deleted (e.g. status: deleted). If instead the file exists, a hashing technique may be applied to determine whether the file has changes. A hashcode is generated based on hashing the file content. If the hashcode matches a hashcode maintained in the configuration data for the CI (as may have been determined during or based on a prior-performed discovery procedure), an updated status for the configuration information may be returned indicating that the file has not changes (e.g. status: unchanged). If instead the generated hashcode does not match the hashcode maintained in the configuration data for the CI, the updated status may indicated that the file was changed (e.g. status: changed), and the hashcode of the changed file may be stored as configuration information of the CMDB system.

If the CI is a software component, then the verification check checks one or more of the following: (i) whether the software component main path/instance home exists on the server; (ii) whether desired (e.g. all) software component process(es) are running on the server, or (iii) whether desired (e.g. all) software component listen network ports are active/listening on the server. In some examples, each of (i), (ii) and (iii) are checked and further action is taken accordingly. If (i), (ii), and (iii) are all answered false/in the negative, then the software component is marked in the CMDB configuration information with an updated status of dormant or deleted. If instead one or two of these inquiries are answered false/in the negative, then the software component is marked as stopped or damaged.

In either example above, if the CI was not marked as dormant or deleted, then the CMDB system performs checks to determine whether that CI contains other Configuration Items. If so, then the process can recursively perform the verification check for all of the contained Configuration Items.

An extension to the preceding process flow can include performing further actions in the case where the updated status indicates that the CI was modified. In this case, appropriate data (for instance the changed CI itself, properties, or metadata about the changed CI) can be gathered and stored to ascertain what exactly was modified. A re-discovery can be issued against a CI. In the file CI example, if the hashcodes do not match (indicating a change to the file), the file content can be gathered and dealt with in any desired way, such as to examine the specific changes and/or store the changed information. In the software component example, if the software component is marked as stopped or damaged, data may be gathered for each software component process that is running on the system (PID, arguments etc.) and dealt with in any desired way.

In yet another embodiment, a method is provided to determine dormant CIs and inactive or stopped CIs based on combining data that comes from a regular discovery procedure and data that comes from the preceding process flow and/or extension thereof. For example, a regular discovery procedure is performed against a chosen scope, such as a chosen IP address. After the regular discovery procedure finishes, the CMDB system queries (e.g. from the configuration management database) to identify Configuration Items discovered on the given IP address but not discovered during the last (i.e. most recent) discovery procedure run. This can be determined by using the last discovery timestamp recorded in the CMDB for each Configuration Item. The extended process flow described above is then performed against the identified CIs, on the basis that something in their status must have changed between an early discovery procedure and the most recent discovery procedure run, which detected then as being inactive or stopped.

The above processes can be repeated for several CIs. The time savings and targeted information discovery associated with these processes in comparison to the traditional discovery procedure, which performs a sweep for all CIs in a defined scope, is still significant. The particular CIs against which the verification checks can be performed may be selected in any desired manner. For example, one or more CIs may be manually identified (e.g. by an administrator), they may be identified for a given chosen context IP address/hostname, and/or they may be chosen for a given context IP address/hostname contained in chosen scope, as examples. Additionally, using the example above of determining dormant CIs and inactive or stopped CIs based on combining data that comes from a regular discovery procedure and data that comes from the preceding process flow and/or extension thereof, the chosen IP can be chosen based on manual selection of a chosen IP address, all Configuration Items may be considered for a chosen context IP address/hostname, and/or all IP addresses contained in chosen scope may be targeted, as examples.

The verification checks described herein can be initiated in any desired way, for instance manually and/or scheduled to automatically perform, as examples.

A specific example of a verification check procedure is presented in the context of Apache® web servers. Assume during a traditional discovery procedure that the provider discovers two running Apache® Servers on the target machine but there are known to be three Apache® server CIs stored and indicated in the CMDB database for that target. This indicates that the status of the initially-discovered by more recently undiscovered third server is to be updated. The results of a quick verification check as described herein may confirm the existence of configuration files of the missing third server and of the installation path on the hard drive, therefore this third server can be marked as stopped or inactive. If the quick verification does not find an installation path and/or configuration files, this third server can be marked as dormant or just deleted.

In some examples, that quick verification check may be run automatically in parallel with regular target discovery procedure, for instance initiated automatically or manually during that discovery procedure immediately or near immediately after the discovery procedure discovers that the third server was not discovered but should have been, as indicated in the CMDB configuration information. In some embodiments, the discovery procedure itself, upon discovering the non-presence of the third server, invokes the verification check.

Aspects described herein may be used in different ways, for instance in solving IT problems/tickets, maintaining up-to-date key configuration data for CIs, maintaining a more accurate change history, for example in a situation where the configuration file and/or software component module (war, ear, jar) changed several times between the regular scheduled discovery procedures. Additionally, the combination of the verification check described herein and a regular discovery can help identify an actual state of the CIs (existence, status), rather than merely identifying the asset as being undiscovered upon a subsequent discovery procedure.

Figure 3:
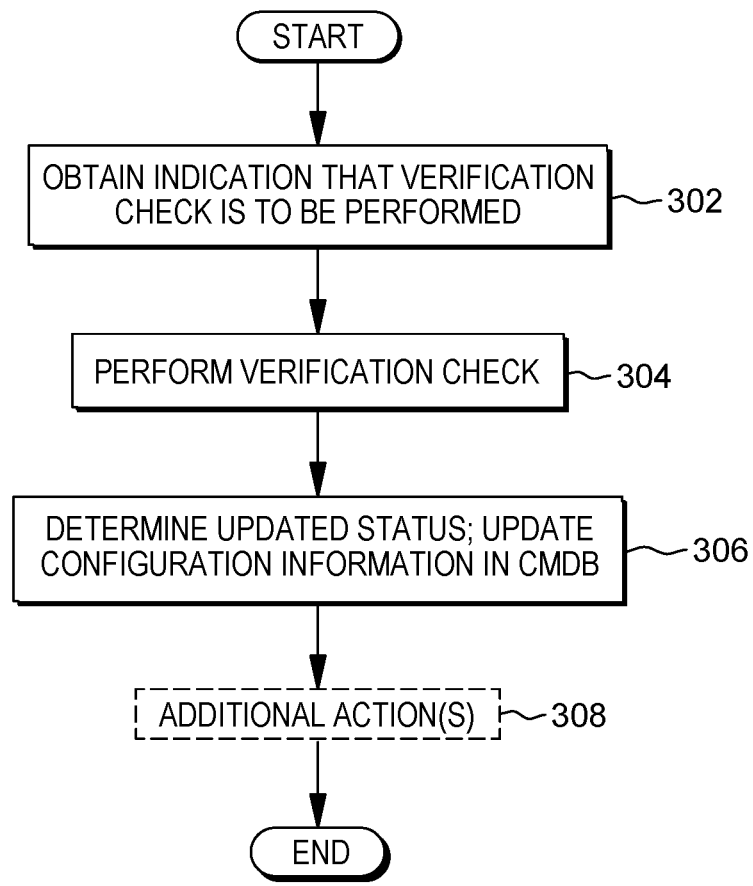
FIG. 3 depicts an example process for on-demand configuration management database configuration item verification, in accordance with aspects described herein.

Accordingly, FIG. 3 depicts an example process for on-demand configuration management database configuration item verification, in accordance with aspects described herein. In some examples, the process of FIG. 3 is performed by one or more computer system(s), such as one or more CMDB systems.

The process begins by obtaining an indication that a verification check is to be performed for a configuration management database (CMDB) configuration item (302). For instance, the verification check may be triggered automatically or manually by an administrator, as examples. The CMDB configuration item may be an information technology asset of a computing environment and be previously discovered as part of a CMDB configuration item discovery procedure for a CMDB system. The CMDB configuration item may be previously discovered on a hosting component hosting the CMDB configuration item, and the discovery procedure may provide configuration data associated with the CMDB configuration item, the configuration data stored as part of CMDB configuration information of the CMDB system.

The process proceeds by performing a verification check of the CMDB configuration item (304). The verification check may be tailored to the CMDB configuration item, and performing the verification check can include using the configuration data provided by the discovery procedure to target at least one inquiry to the hosting component. The process then determines an updated status of the CMDB configuration item based on performing the verification check, and updates the CMDB configuration information to reflect the updated status (306). For instance, the updated status can indicate whether the CMDB configuration item remains in existence or whether the CMDB configuration item has changed. Based on a response to the at least one inquiry indicating that the CMDB configuration item is no longer in existence or has changed, the CMDB configuration information about the CMDB configuration item may be updated to reflect for the CMDB system the updated status of the CMDB configuration item, the updated status being that the CMDB configuration item is non-existent or has been changed.

The at least one inquiry to the hosting component can include one or more inquiries to the CMDB configuration item itself that was previously discovered on the hosting component and may or may not still be existent on that hosting component. In this case, the one or more inquiries are directed to the hosting component and more specifically a component (e.g. the CI) thereof. In an example where the CI is a software component hosted on an application server, the inquiry may be one that targets that software component itself by sending the inquiry to the application server hosting the software component. Additionally or alternatively, the at least one inquiry may include one or more inquires to the hosting component itself for handling.

In embodiments where the CMDB configuration item includes or is a data file, the verification check (304) can use a file path indicated in configuration data associated with the data file to determine whether the data file still exists. Based on determining that the data file no longer exists, the CMDB configuration information may be updated to identify the data file as being dormant or deleted.

In embodiments where the CMDB configuration item includes or is a data file, the verification check (304) can use a hashing technique to determine whether the data file has been modified, where based on determining that the data file has been modified, updated content of the data file can be obtained from the hosting component hosting the data file.

In embodiments where the CMDB configuration item includes or is a software component, the hosting component hosting the software component can include a server and the configuration data associated with the CMDB configuration item can include a main instance path to the software component, a checksum of a file of the software component, information about runtime processes, and one or more expected active network address and port combinations of the software component. In these examples, the verification check (304) can include determining whether a main instance path exists on the server, whether software component runtime processes are running on the server, and/or whether the one or more expected active network address and port combinations are active or listening on the server. Additionally or alternatively, one or more of the at least one inquiry can target the software component being hosted on the hosting component. Based on determining that the main instance path does not exist on the server, the software component processes are not running on the server, and the one or more expected active network address and port combinations are not active or listening on the server, the process can include updating the CMDB configuration information about the software component to identify the software component as being dormant. Alternatively, based on determining that the main instance path does not exist on the server, the software component processes are not running on the server, or the one or more expected active network address and port combinations are not active or listening on the server, the process can perform, for instance, at least one from the group consisting of: updating the CMDB configuration information about the software component to identify the software component as being stopped or damaged, and gathering data about each of the software component processes that are running on the server. This can be performed by an optional aspect of the process of FIG. 3 in which additional action(s) are optionally performed (308).

In some examples, the discovery procedure includes a first discovery procedure and the process can further include querying, based on performance of a second discovery procedure, the CMDB system to identify whether one or more CMDB configuration items discovered by the first discovery procedure were not discovered by the second discovery procedure. Failure to discover one or more such CMDB configuration items by the second discovery procedure indicates at least one change to the one or more CMDB configuration items. This can be used to trigger performance of the other aspects of FIG. 3, e.g. 302, 304, 306, 308. Accordingly, based on determining that one or more CMDB configuration items discovered by the first discovery procedure were not discovered by the second discovery procedure, the process can include performing the verification check (304) for one CMDB configuration item of the one or more CMDB configuration items and determining (306) the updated status of the one CMDB configuration item, repeating performing the verification check for any remaining CMDB configuration items of the one or more CMDB configuration items, determining an updated status of the any remaining CMDB configuration item, and updating the CMDB configuration information to indicate, for the CMDB system, the at least one change to the one or more CMDB configuration items (i.e. iterative 304, 306, 308 one or more times until all desired CIs have been addressed.

In some embodiments, the process is repeated where a particular CI being considered itself includes other CIs. Thus, a process can determine whether the CMDB configuration item includes one or more additional CMDB configuration items. Based on determining that the CMDB configuration item does include one or more additional CMDB configuration items, the process can repeat, for each such additional CMDB configuration item of the one or more additional CMDB configuration items, the performing the verification check of the additional CMDB configuration item and the determining the updated status of the additional CMDB configuration item.

Figure 4:
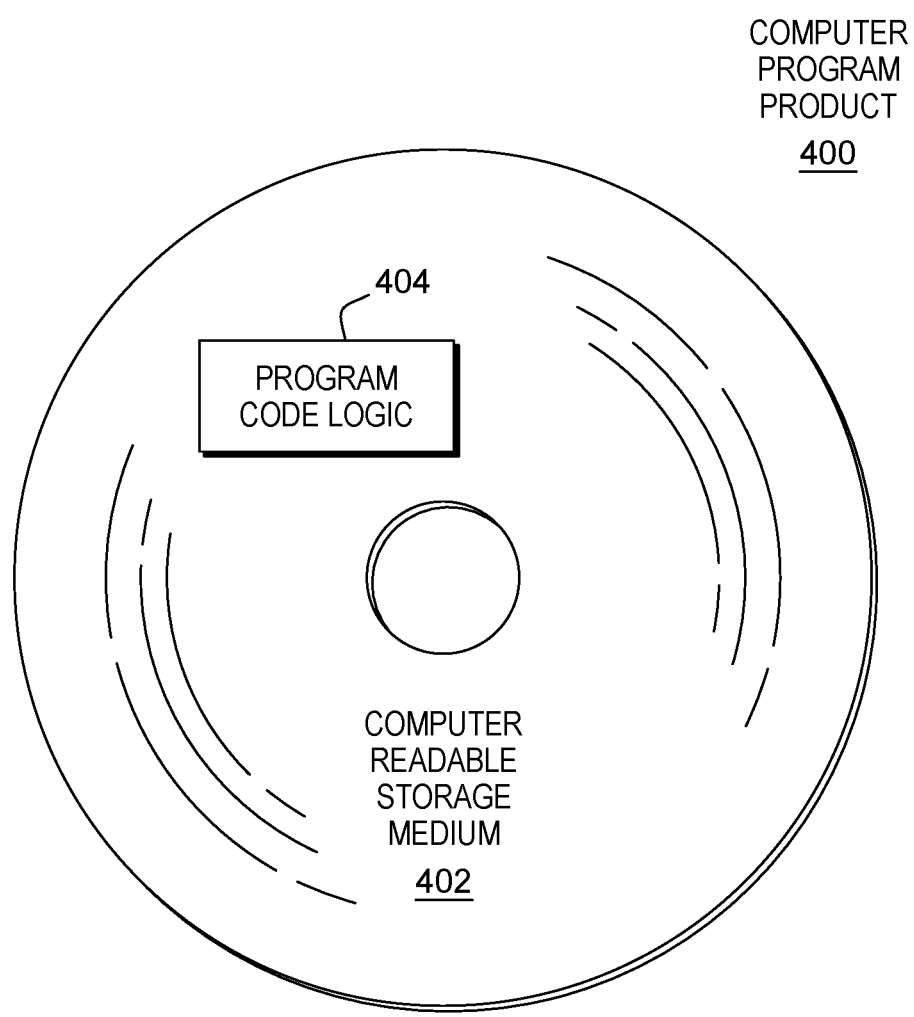
FIG. 4 depicts one embodiment of a computer program product to incorporate aspects described herein.

In accordance with some embodiments, and referring to FIG. 4, in one example, a computer program product 400 includes, for instance, one or more computer readable storage media 402 to store computer readable program code means, logic and/or instructions 404 thereon to provide and facilitate one or more embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
   discovering a configuration management database (CMDB) configuration item as part of a first CMDB configuration item discovery procedure for a CMDB system;
   failing to discover the CMDB configuration item as part of a second CMDB configuration item discovery procedure for the CMDB system;
   based on failing to have discovered the CMDB configuration item as part of the second CMDB configuration item discovery procedure, obtaining an indication that a verification check is to be performed for the CMDB configuration item, the CMDB configuration item being an information technology asset, of a computing environment, that was previously discovered as part of the first CMDB configuration item discovery procedure on a hosting component hosting the CMDB configuration item, the first CMDB configuration item discovery procedure providing configuration data associated with the CMDB configuration item, and the configuration data stored as part of CMDB configuration information of the CMDB system;
   based on failing to have discovered the CMDB configuration item as part of the second CMDB configuration item discovery procedure and on obtaining the indication that the verification check is to be performed, performing the verification check of the CMDB configuration item, the verification check being tailored to the CMDB configuration item, and the performing the verification check comprising obtaining from the CMDB the configuration data provided by the first CMDB configuration item discovery procedure and using the obtained configuration data to build and target at least one inquiry to the hosting component; and
   determining an updated status of the CMDB configuration item based on performing the verification check.

2. A computer program product comprising:
   a computer readable storage medium readable by a processing circuit and storing instructions for execution by the processing circuit for performing a method comprising:
      discovering a configuration management database (CMDB) configuration item as part of a first CMDB configuration item discovery procedure for a CMDB system;
      failing to discover the CMDB configuration item as part of a second CMDB configuration item discovery procedure for the CMDB system;
      based on failing to have discovered the CMDB configuration item as part of the second CMDB configuration item discovery procedure, obtaining an indication that a verification check is to be performed for the CMDB configuration item, the CMDB configuration item being an information technology asset, of a computing environment, that was previously discovered as part of the first CMDB configuration item discovery procedure on a hosting component hosting the CMDB configuration item, the first CMDB configuration item discovery procedure providing configuration data associated with the CMDB configuration item, and the configuration data stored as part of CMDB configuration information of the CMDB system;
      based on failing to have discovered the CMDB configuration item as part of the second CMDB configuration item discovery procedure and on obtaining the indication that the verification check is to be performed, performing the verification check of the CMDB configuration item, the verification check being tailored to the CMDB configuration item, and the performing the verification check comprising obtaining from the CMDB the configuration data provided by the first CMDB configuration item discovery procedure and using the obtained configuration data to build and target at least one inquiry to the hosting component; and
      determining an updated status of the CMDB configuration item based on performing the verification check.

3. A computer system comprising:
   a memory; and
   a processor in communication with the memory, wherein the computer system is configured to perform a method, the method comprising:
      discovering a configuration management database (CMDB) configuration item as part of a first CMDB configuration item discovery procedure for a CMDB system;
      failing to discover the CMDB configuration item as part of a second CMDB configuration item discovery procedure for the CMDB system;

based on failing to have discovered the CMDB configuration item as part of the second CMDB configuration item discovery procedure, obtaining an indication that a verification check is to be performed for the CMDB configuration item, the CMDB configuration item being an information technology asset, of a computing environment, that was previously discovered as part of the first CMDB configuration item discovery procedure on a hosting component hosting the CMDB configuration item, the first CMDB configuration item discovery procedure providing configuration data associated with the CMDB configuration item, and the configuration data stored as part of CMDB configuration information of the CMDB system;

based on failing to have discovered the CMDB configuration item as part of the second CMDB configuration item discovery procedure and on obtaining the indication that the verification check is to be performed, performing the verification check of the CMDB configuration item, the verification check being tailored to the CMDB configuration item, and the performing the verification check comprising obtaining from the CMDB the configuration data provided by the first CMDB configuration item discovery procedure and using the obtained configuration data to build and target at least one inquiry to the hosting component; and determining an updated status of the CMDB configuration item based on performing the verification check.

4. The method of claim 1, wherein the updated status indicates whether the CMDB configuration item remains in existence or whether the CMDB configuration item has changed.

5. The method of claim 1, further comprising, based on a response to the at least one inquiry indicating that the CMDB configuration item is no longer in existence or has changed, updating CMDB configuration information about the CMDB configuration item to reflect for the CMDB system the updated status of the CMDB configuration item, the updated status being that the CMDB configuration item is non-existent or has been changed.

6. The method of claim 1, wherein the CMDB configuration item comprises a data file, and wherein the verification check uses a file path indicated in configuration data associated with the data file to determine whether the data file still exists, wherein the method further comprises, based on determining that the data file no longer exists, updating the CMDB configuration information to identify the data file as being dormant or deleted.

7. The method of claim 1, wherein the CMDB configuration item comprises a data file, and wherein the verification check uses a hashing technique to determine whether the data file has been modified, and wherein the method further comprises, based on determining that the data file has been modified, obtaining updated content of the data file from the hosting component hosting the data file.

8. The method of claim 1, wherein the CMDB configuration item comprises a software component, the hosting component hosting the software component comprises a server, and the configuration data associated with the CMDB configuration item comprises a main instance path to the software component, a checksum of a file of the software component, information about runtime processes, and one or more expected active network address and port combinations of the software component, and wherein the verification check comprises determining whether a main instance path exists on the server, whether software component runtime processes are running on the server, and whether the one or more expected active network address and port combinations are active or listening on the server.

9. The method of claim 1, further comprising:
determining whether the CMDB configuration item comprises one or more additional CMDB configuration items; and
based on determining that the CMDB configuration item comprises one or more additional CMDB configuration items, repeating, for each additional CMDB configuration item of the one or more additional CMDB configuration items, the performing the verification check of the additional CMDB configuration item and the determining the updated status of the additional CMDB configuration item.

10. The computer program product of claim 2, wherein the updated status indicates whether the CMDB configuration item remains in existence or whether the CMDB configuration item has changed.

11. The computer program product of claim 2, wherein the method further comprises, based on a response to the at least one inquiry indicating that the CMDB configuration item is no longer in existence or has changed, updating CMDB configuration information about the CMDB configuration item to reflect for the CMDB system the updated status of the CMDB configuration item, the updated status being that the CMDB configuration item is non-existent or has been changed.

12. The computer program product of claim 2, wherein the CMDB configuration item comprises a data file, and wherein the verification check uses at least one selected from the group consisting of: (i) a file path indicated in configuration data associated with the data file to determine whether the data file still exists, and (ii) a hashing technique to determine whether the data file has been modified, and wherein the method further comprises at least one selected from the group consisting of: (i) based on determining that the data file no longer exists, updating the CMDB configuration information to identify the data file as being dormant or deleted, and (ii) based on determining that the data file has been modified, obtaining updated content of the data file from the hosting component hosting the data file.

13. The computer program product of claim 2, wherein the CMDB configuration item comprises a software component, the hosting component hosting the software component comprises a server, and the configuration data associated with the CMDB configuration item comprises a main instance path to the software component, a checksum of a file of the software component, information about runtime processes, and one or more expected active network address and port combinations of the software component, and wherein the verification check comprises determining whether a main instance path exists on the server, whether software component runtime processes are running on the server, and whether the one or more expected active network address and port combinations are active or listening on the server.

14. The computer system of claim 3, wherein the updated status indicates whether the CMDB configuration item remains in existence or whether the CMDB configuration item has changed.

15. The computer system of claim 3, wherein the method further comprises, based on a response to the at least one inquiry indicating that the CMDB configuration item is no longer in existence or has changed, updating CMDB configuration information about the CMDB configuration item to reflect for the CMDB system the updated status of the CMDB configuration item, the updated status being that the CMDB configuration item is non-existent or has been changed.

16. The computer system of claim 3, wherein the CMDB configuration item comprises a data file, and wherein the verification check uses at least one selected from the group consisting of: (i) a file path indicated in configuration data associated with the data file to determine whether the data file still exists, and (ii) a hashing technique to determine whether the data file has been modified, and wherein the method further comprises at least one selected from the group consisting of: (i) based on determining that the data file no longer exists, updating the CMDB configuration information to identify the data file as being dormant or deleted, and (ii) based on determining that the data file has been modified, obtaining updated content of the data file from the hosting component hosting the data file.

17. The computer system of claim 3, wherein the CMDB configuration item comprises a software component, the hosting component hosting the software component comprises a server, and the configuration data associated with the CMDB configuration item comprises a main instance path to the software component, a checksum of a file of the software component, information about runtime processes, and one or more expected active network address and port combinations of the software component, and wherein the verification check comprises determining whether a main instance path exists on the server, whether software component runtime processes are running on the server, and whether the one or more expected active network address and port combinations are active or listening on the server.

18. The method of claim 8, wherein based on determining that the main instance path does not exist on the server, the software component processes are not running on the server, and the one or more expected active network address and port combinations are not active or listening on the server, the method further comprises updating the CMDB configuration information about the software component to identify the software component as being dormant.

19. The method of claim 8, wherein based on determining that the main instance path does not exist on the server, the software component processes are not running on the server, or the one or more expected active network address and port combinations are not active or listening on the server, the method further comprises performing at least one from the group consisting of: updating the CMDB configuration information about the software component to identify the software component as being stopped or damaged, and gathering data about each of the software component processes that are running on the server.

* * * * *